United States Patent [19]
Grinager

[11] Patent Number: 5,290,141
[45] Date of Patent: Mar. 1, 1994

[54] CONTINUOUS DOWN STACKER APPARATUS

[75] Inventor: Michael R. Grinager, Miltona, Minn.

[73] Assignee: Brenton Engineering Inc., Minn.

[21] Appl. No.: 92,958

[22] Filed: Jul. 19, 1993

Related U.S. Application Data

[63] Continuation of Ser. No. 973,303, Nov. 6, 1992, abandoned.

[51] Int. Cl.⁵ .............................................. B65G 57/02
[52] U.S. Cl. .............................. 414/790.3; 414/790.4; 414/790.8; 414/790.9; 414/924
[58] Field of Search ............... 414/789.9, 790.3, 790.4, 414/790.8, 790.9, 794.4, 924, 926

[56] References Cited

U.S. PATENT DOCUMENTS

| | | | |
|---|---|---|---|
| 3,027,817 | 4/1962 | Loeffler | 414/790.8 |
| 3,107,013 | 10/1963 | Euwe | 414/790.3 |
| 4,805,890 | 2/1989 | Martin | 414/789.9 |
| 4,902,184 | 2/1990 | Fritz | 414/790.3 |

FOREIGN PATENT DOCUMENTS

| | | | |
|---|---|---|---|
| 16268 | 2/1978 | Japan | 414/790.9 |
| 307769 | 1/1969 | Sweden | 414/790.8 |
| 444015 | 2/1968 | Switzerland | 414/790.3 |

Primary Examiner—Michael S. Huppert
Assistant Examiner—Gregory A. Morse
Attorney, Agent, or Firm—Herman H. Bains

[57] ABSTRACT

A continuous downstacker apparatus is operable for continuously stacking product in a predetermined stacked pattern. The downstacker apparatus includes a pair of lowerating-pushing heads which continuously move in a vertical elliptical walking beam pattern for receiving, stacking and pushing stacked product from a stacking chamber. The product is delivered to the stacking chamber by conveyor means and the lowerating-pushing heads are shiftable on a support frame for vertical and horizontal components of movement during the stacking and pushing cycle.

10 Claims, 3 Drawing Sheets

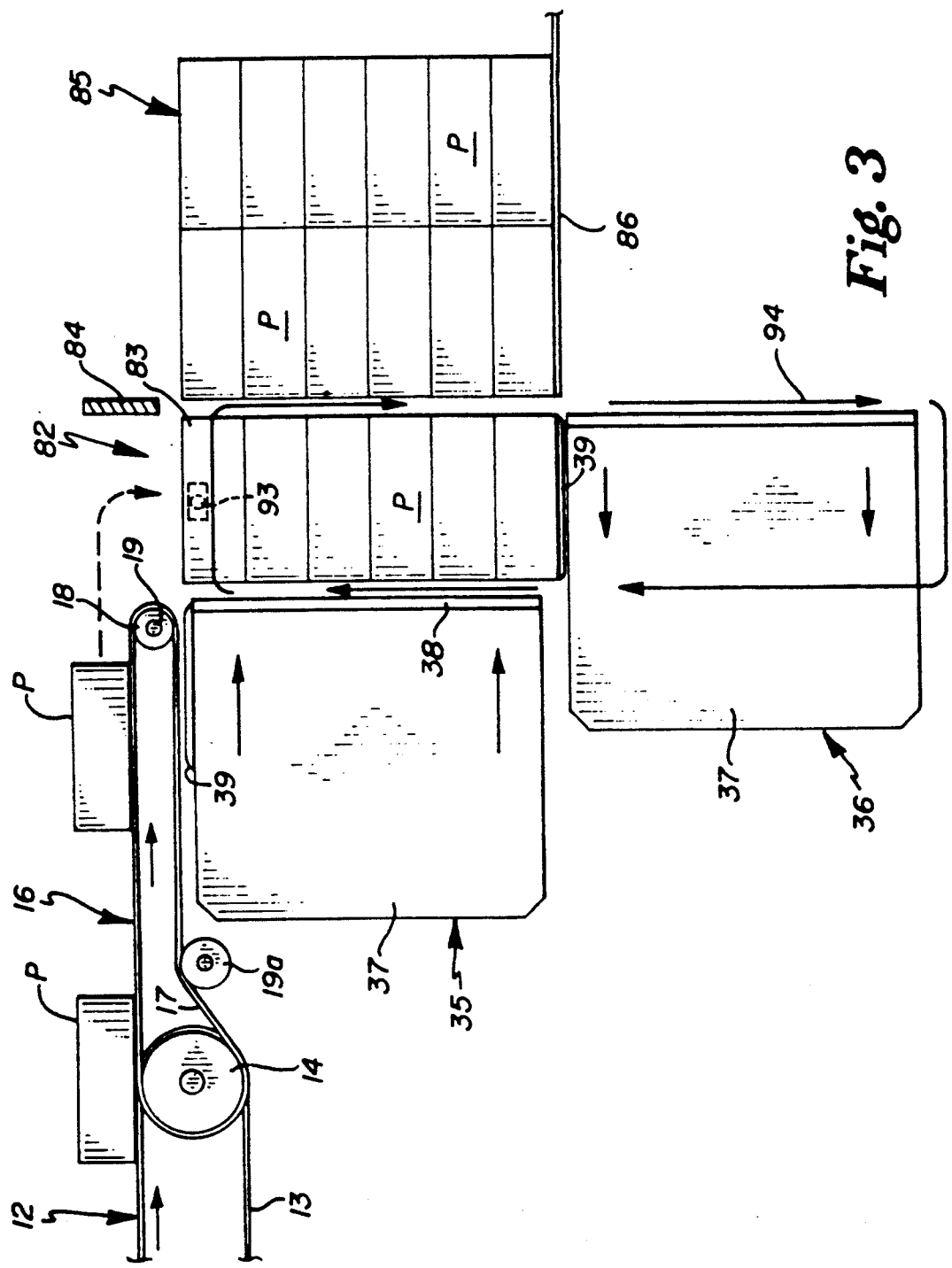

5,290,141

CONTINUOUS DOWN STACKER APPARATUS

This is a continuation of U.S. application Ser. No. 07/973,303, filed Nov. 6, 1992, now abandoned.

FIELD OF THE INVENTION

This invention relates to a stacking apparatus and more particular to a stacking apparatus for continuously stacking articles such as cartons.

BACKGROUND OF THE INVENTION

In the art of product handling apparatus, there is a group of product stacking devices known as down stackers. These downstacker devices receive product (usually cartons or packages) from an infeed conveyor that is operable to provide a space or gap between adjacent cartons. The space between adjacent products is usually a gap approximating the products length. The product is delivered to a stacking chamber by the conveyor and the product is dropped onto lowerating device which moves downwardly as the product comes in. Once the stacking chamber has the proper number of vertically stacked product in it, the incoming products are then clamped to a stop while a pusher mechanism pushes the accumulated product out of the stacking The pusher then retracts and the lowerating mechanism cycle starts over again. This continues until the proper number of stacks are accumulated in the stack accumulation area at which time the stacked product may be loaded into a case mechanically or hand packed off as desired. These prior art downstacker devices involve an interrupted operation and are not continuous.

SUMMARY OF THE INVENTION

It is an object of this invention to provide a novel high speed reliable continuous downstacker apparatus including a pair of lowerating-pushing heads which are moveable through an elliptical path of travel to successively and sequentially stack products in the stacking chamber without having the conveyed product surging into itself.

Another object of this invention is to provide a continuous downstacker apparatus which is operable to accept product from an infeed conveyor regardless of its spacing and delivery speed thereby obviating the need to accumulate product.

A further object of this invention is to provide a novel continuous high speed down stacker apparatus, of simple and inexpensive construction, which can be operated to handle product more gently because of its continuous capability.

The present downstacker apparatus includes a pair of lowerating-pushing heads which are mounted for vertical reciprocating movement between a lowered stacking position and an elevated return position. The lowerating-pushing heads are also mounted for longitudinal translation between a retracted position and a forward position for pushing the product from the stacking chamber. This vertical and horizontal reciprocation of the lowerating-pushing heads is synchronized and controlled by sevro motors so that the overall continuous movement of the lowerating-pushing heads is that of a walking beam. More specifically, the lower rating-pushing heads are moved through a vertical generally elliptical path of travel during the stacking operation.

FIGURES OF THE DRAWING

FIG. 1 is a side elevation view of the apparatus;
FIG. 2 is a vertical plan view of the apparatus with certain parts omitted for clarity, and;
FIG. 3 is diagrammatic side elevational view of the apparatus illustrating the continuous movement of the lowerating-pushing heads.

DESCRIPTION OF THE PREFERRED EMBODIMENT

Figure 1:
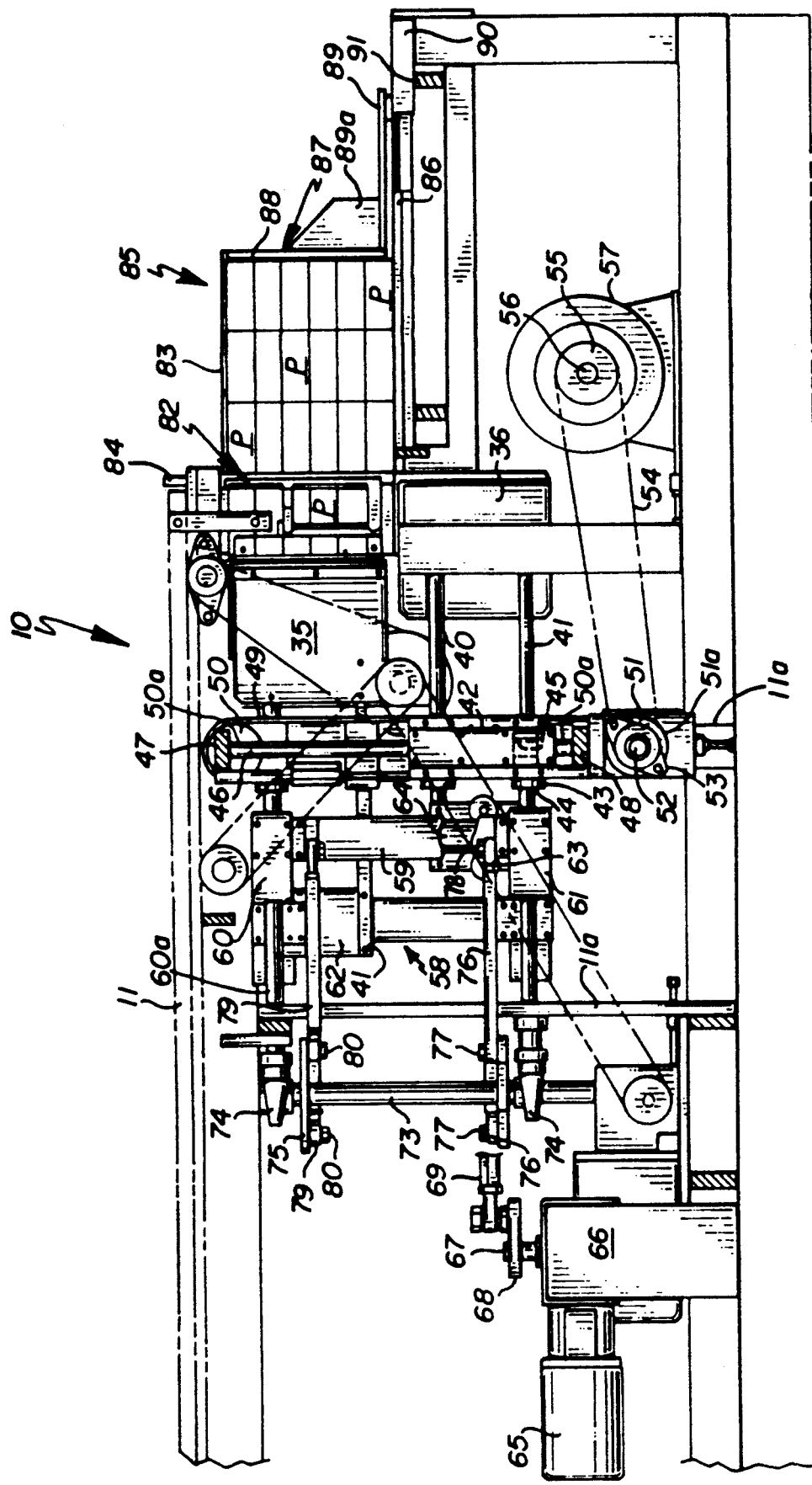
Figure 2:
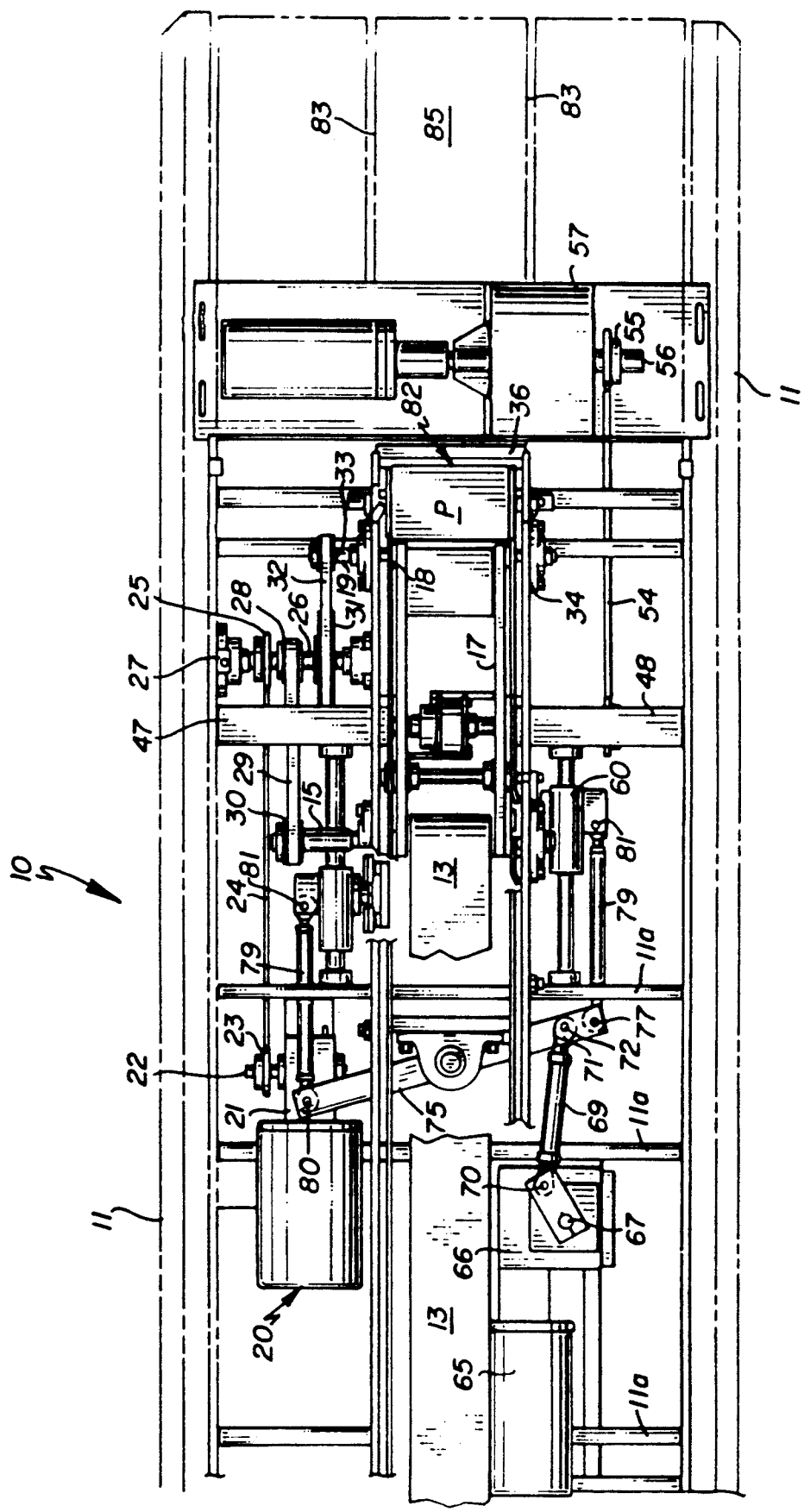

Referring now to the drawings, it will be seen that one embodiment of my novel downstacker apparatus, designated generally by the reference numeral 10, is thereshown. The downstacker apparatus 10 stacks products, usually cartons or boxes, in a stacking chamber for subsequent mechanical loading or hand packing into cases at a down stream station. The downstacking apparatus is therefore usually used as a part of another system.

The downstacker apparatus includes a frame 11 upon which the various components are mounted. The cartons or boxes are continuously delivered to the stacking chamber by an endless infeed conveyor 12 which is comprised of an endless conveyor belt 13 trained about suitable rollers including the drive roller 14 which is mounted on a shaft 15 as best seen in FIG. 3.

The infeed conveyor 12 delivers the product to an accelerator conveyor 16 which is comprised of a pair of laterally spaced apart endless narrow belt elements 17 which are trained about rollers 18 keyed to a shaft 19. It will be noted that the rollers 18 are located downstream of the end of the infeed conveyor and defines the discharge end of the accelerator conveyor.

Means are provided for driving the infeed and accelerator conveyors and this means includes an electric motor 20 having a gear reduction mechanism 21 operatively connected thereto. The output shaft 22 of the gear reduction mechanism is provided with a drive sprocket 23 having an endless drive chain 24 trained thereon.

The drive chain 24 is trained about a driven sprocket 25 keyed to a shaft 26 that is journaled in suitable pillow bearings 27 mounted on the frame 11. A driven sprocket 28 is also keyed to the shaft 26 for rotation therewith. The sprocket 28 has an endless chain 29 trained thereon and also trained about sprocket 30 keyed to the shaft 15. It will therefore be seen that when the motor 20 is energized, the endless conveyor 13 will be driven.

It will also be seen that the shaft 26 has a large sprocket 31 keyed thereto and an endless chain 32 is trained about the sprocket 31 and a smaller sprocket 33 keyed to the shaft 19. The shaft 19 is journaled in suitable pillow bearings 34 mounted on the frame 11. The shaft 19 has the rollers 18 for the narrow belt element 17 for the accelerator conveyor 16 trained thereon. With this arrangement, when the motor 20 is energized, the accelerator conveyor along with the infeed conveyor will be simultaneously driven. The speed of the upper runs of the accelerator conveyor belt elements is substantially greater than the speed of the infeed conveyor.

The downstacker apparatus 10 also includes a pair of lowerating-pushing heads 35,36. The heads 35 and 36 are substantially identical in construction and each includes a vertical substantially rectangular planar side plate 37 having a vertical substantially rectangular planar front pusher plate 38 rigidly affixed thereto and extending at right angles therefrom. Each of the heads also includes a substantially rectangular flat support plate 39 rigidly affixed to the upper edges of the side plate 37 and the front pusher plate 38. The rectangular shaped support plate 39 for each head is sized and dimensioned for supporting product P thereon during the stacking operation.

Each lowerating-pushing head 35,36 has an upper horizontally disposed elongate rod 40 rigidly affixed to the side plate 37 and projecting rearwardly therefrom. Each head 35, 36 also has a lower horizontally disposed elongate guide rod 41 secured to the side plate and projecting rearwardly therefrom. The upper and lower guide rods 40,41 for each head are disposed in vertically spaced apart parallel relation.

The lowerating-pushing heads 35,36 are moved vertically during the stacking operation. Means are provided for shifting the heads 35,36 vertically and includes a pair of generally rectangular shaped vertically disposed carrier plates 42 each having a pair of vertically spaced apart guide blocks 43 secured thereto. Each guide block 43 has a horizontal opening 44 therein and each guide block 43 has a vertical opening 45 therein. The vertical openings in each pair of guide blocks attached to a carrier plate are disposed in vertical alignment.

The upper and lower horizontal rods 40,41 for each of the heads 35, 36 project through the guide blocks 43 for each carrier plate 42. A pair of laterally spaced apart substantially parallel vertical guide rods 46 are secured to and extend between an upper frame member 47 and a lower frame member 48 of the frame 11. One of the guide rods 46 extends through the vertical openings in the guide blocks 43 in one of the carrier plates 42 while the other vertical guide rod 46 extends through the vertical openings in the guide blocks 43 of the other carrier plate. It will be seen that when the carrier plates 42 are shifted vertically, the associated lowerating-pushing head will also be vertically shifted.

Means are provided for vertically shifting the carrier plates and the associated lowerating-pushing head and this means includes an endless timing gear belt 49 which is similar to the gear belt disclosed in the co-pending U.S. application filed Apr. 29, 1991, Ser. No. 07/693,792 entitled Continuous Stacker. The gear belt 49 has a smooth outer surface and a serrated inner surface which defines a plurality of teeth that engage an upper sprocket 50 mounted on a shaft 50a journaled in suitable pillow bearings (not shown) mounted on the frame 11. The gear belt is also trained about a lower sprocket 51 keyed to a shaft 52 journaled in suitable pillow bearings 53 which are mounted on the frame 11. An endless drive chain 54 is trained about a sprocket 51a secured to the shaft 52 and is trained about a drive sprocket 55 secured to the output shaft 56 of a servo motor 57. The servo motor 57 is reversible and when operated in one direction, the gear belt 49 will be driven to lower the head 35 while simultaneously elevating the head 36.

During the stacking cycle, the lowerating-pushing heads 35,36 are sequentially advanced during the pushing stroke and retracted during the return stroke. Means are provided for advancing and retracting the lowerating-pushing heads 35,36 during the advance and return strokes. This means includes a pair of U-shaped carriages 58 each including a vertical plate 59 having an upper generally rectangular shaped guide block 60 rigidly secured to the upper end portion thereof and a lower generally rectangular shaped guide block 61 rigidly secured to the lower end portion thereof. These carriages 58 are laterally spaced apart, and it will be seen that the upper and lower rods 40,41 of each lowerating-pushing head 35,36 are attached to one of the carriages 58. Each of the carriages 58 also has a generally rectangular shaped vertically disposed flat roller mounting plate 62 secured thereto adjacent one end thereof. Each roller plate has a pair of horizontally spaced apart vertically disposed rollers 63 journaled on suitable roller axles for rotation about horizontal transverse axes. Each roller 63 has a V-shaped circumferential annular groove therein. The rollers 63 for each roller mounting plate engage the vertically disposed knife edges of vertically disposed guide tracks 64 rigidly secured to the rectangular guide blocks 60, 61.

It will also be seen that horizontal upper and lower guide rods 60a extend between rigid frame members 11a and 11b. The guide rods 60 a extend through the guide blocks 60,61 and guide the carriages 58 during horizontal reciprocating movement thereof.

The coaction of the rollers 63 with the vertical tracks 64 allow the U-shaped carriages to shift vertically simultaneously during the horizontal movement of these carriages. Means are provided for shifting the carriages horizontally in a fore and aft direction and this means includes a servo motor 65 having a gear reduction mechanism 66. The output shaft 67 of the gear reduction mechanism has a crank arm 68 secured thereto for rotation therewith. The crank arm 68 is pivotally connected to one end of an elongate arm 69 by a pivot 70. The other end of the arm 69 is pivotally connected to one end of a lower elongate crank lever 71 by a pivot 72. The lower crank lever 71 is keyed to a vertical rock shaft 73 having its upper and lower ends journaled in suitable vertically spaced apart pillow bearings 74 secured to the frame member 11a of the frame 11. The vertical rock shaft 73 also has an upper crank lever 75 keyed thereto for rotation therewith. The lower and upper crank levers 71,75 are disposed in parallel vertically aligned relation.

The lower crank lever 71 is pivotally connected at opposite ends thereof to the ends of a pair of elongate lower arms 76 by pivots 77. The other ends of the respective lower arms 76 are pivotally connected by pivots 78 to ears rigidly affixed to the lower guide blocks 61 of the carriages 58. The respective rear ends of a pair of elongate upper arms 79 are pivotally connected to opposite ends of the upper crank lever 75 by pivots 80. The other or front ends of the upper arms 79 are pivotally connected by pivots 81 to ears rigidly affixed to the upper guide block 60 of the carriages 58.

It will be seen that when the output shaft 67 is rotated through the operation of the servo motor 65, the crank arm 66 will also be rotated and will cause the lower crank lever 71, the vertical rock shaft 73 and the upper crank lever 75 to be shifted in crank fashion to thereby cause reciprocation of the upper arms 79 and the lower arms 76. This longitudinal or translatory shifting action of the upper and lower arms causes corresponding reciprocating motion to the lowerating-pushing heads 35,36 via the guide rods 40,41 associated therewith. The coaction of carriages 58 with the vertical tracks 54 via the rollers 63 also permits the vertical shifting movement of the lowerating-pushing heads 35,36. The downstacker apparatus also includes a stacking chamber 82 located adjacent the discharge end of the accelerator conveyor 16. The stacking chamber is defined by a pair of laterally spaced apart side walls 83 between which the lowerating-pushing heads 35,36 move. A vertically disposed substantially flat stop bar 84 is mounted on the frame 11 and is positioned in confronting relation with respect to the path of travel of a product P discharged from the accelerator conveyor 16. The stop bar 84 is engaged by the product P as it is discharged by the accelerator conveyor 16 and is supported by one of the lowerating-pushing heads 35,36. The downstacker apparatus also includes a stack accumulating area 85 provided with a substantially flat horizontal bottom wall 86 suitable side walls 86a and a shiftable vertically disposed retaining member 87 which is moveable in a fore and aft direction along the bottom wall 86.

The retaining member 87 includes a vertical plate 88 having a vertical dimension equal to or exceeding the height of the stack pattern of product produced by the downstacker apparatus. The retaining member also includes a horizontally disposed lower plate 89 slidable along the bottom wall 86 between a forward position and a retracted position. When the retaining member 87 is in the forward position (upstream), the retaining member 87 will determine the number of product or cartons comprising a stack pattern in a longitudinal direction.

Means are provided for shifting the retaining member 87 in a fore and aft direction between a forward or stack pattern retaining position and a rearward direction when the stacker products is moved out of the stack accumulation area for packing into a larger box or other container. This means includes a rodless air cylinder 90 which is mounted on the frame 11 and which is connected to the lower plate 89 as at 91. The rodless air cylinder is of conventional commercial construction and includes a piston moveable in the cylinder having a band secured to the piston for movement therewith. When the piston is shifted in one direction, the retaining member will be shifted in the opposite direction. It will therefore be seen that by actuating the rodless air cylinder 90, the retaining member can be shifted between its forward upstream retaining position and its downstream rearward release position.

During operation of the downstacker apparatus, the electric motor 20 will be energized to operate the infeed conveyor 12 and the accelerator conveyor 16. A photo electric cell 93 is mounted adjacent the upper end portion of the stacking chamber 82 to sense the incoming product. If there is no incoming product to be sensed, the servo motor 57 will be de-energized and the servo drive will remain inactive until product is discharged from the accelerated conveyor.

It is pointed out that at the beginning of the cycle, one of the lowerating-pushing heads 35,36 will be positioned in downstream position in the stacking chamber and in the fully elevated position so that the support plate 39 of the head will receive product discharge from the accelerator conveyor 16. Referring again to FIG. 3, it will be seen that the lowerating-pushing head 36 is positioned in the fully lowered downstream position. As a head is moved to the downstream fully elevated position it will thereafter receive the product P from the accelerator conveyor and will progressively move downwardly as the product is continuously discharged from the accelerated conveyor.

When the lowerating-pushing head has reached the bottom of its downward stroke, the other loweratingpushing head will be in the position of the head 35 illustrated in FIG. 3. The servo motor 65 will be energized to shift the head 35, as illustrated in FIG. 3, in a downstream direction to push the product from supported relation on the other lowerating-pushing head 36 to the stack accumulation area 85. As the head 35 is shifted in a downstream direction during the pushing stroke, the head 36 will be moved in a forward or upstream direction as a result of operation of the upper and lower crank levers 71,75 and vertical rock shaft 73. The pusher plate 38 of a head in the fully elevated position, moves the product downstream into the stack accumulation area during the pushing stacker. These cycles continue until the desired stack pattern in the stack accumulation area is obtained.

When the last vertical stack of product or boxes P is moved by one of the heads into the stack accumulation area to achieve the desired stack pattern, the downstacker operation will be interrupted to permit removal of the stack pattern from the stack accumulation. In this regard, the servo motor 65 is provided with a sensor to sense the number of pushing cycles performed by the heads 35,36. Operation o the conveyors are accumulated stacks in the stack accumulation area to be removed.

The lowerating-pushing heads 35,36 move in a continuous path of movement 94 as illustrated in FIG. 3. It will be seen that this general elliptical movement is continuous and that the lowerating-pushing heads 35,36 move in a walking beam type motion. It will be noted that there are only two drive motions for the downstacking walking beam system embodied in the downstacker apparatus 10. The two separate servo motor drives provides greater flexibility of change over (changing from one size product or pack pattern to another) and better control of the vertical or stacking movement itself. Through the use of a separate servo motor 57 for producing the vertical movement, the servo motor operation is interrupted by the photo electric eye 93 if no product is detected being discharged into the stacking chamber.

When the product stacked in the accumulating area is moved from the accumulation area, the pushing stroke of one of the heads 35,36 will also shift the retaining member 87 in an upstream direction to allow removal of the stack from the stack accumulation. In this regard, it is pointed out that the rodless air cylinder 90 uses air pressure to advance the retaining member 87 to the upstream retaining position. After the retaining member has been shifted to the retaining position as illustrated in FIG. 1, the air is evacuated from the rodless air cylinder so that there is no resisting air pressure during the push off stroke of the heads 35,36.

It will therefore be seen that I have provided a novel continuous downstacker apparatus which continuously stacks product in a stacking chamber and removes stacked product from a stacking chamber to a stack accumulation area.

Thus it will be seen that I have provided a novel continuous downstacker apparatus which is of simple and inexpensive construction and operation.

What is claimed is:

1. A downstacker apparatus for continuously stacking dimensionally stable product comprising;
   a support frame;
   means on said support frame defining a stacking chamber, a stack accumulation area for receiving and supporting stacked product from the stacking chamber,
   conveyor means on said frame for continuously delivering product in a downstream direction and discharging the product into the stacking chamber, a pair of substantially identical lowerating-pushing heads each having an upper product support element for supporting product to be stacked thereon; and each head having a vertical pushing element, means mounting said lowerating-pushing heads on said frame for continuous vertical shifting movement of said heads between an elevated position and a lower position;

means mounting said lowerating-pushing heads on said frame for shifting movement of said heads between an upstream retracted position adjacent the stacking chamber and a downstream position in said stacking chamber, drive means operatively connected with said lowerating-pushing heads for continuously shifting the heads through a vertical elliptical path of travel, one of said heads during said travel moving downwardly from a fully elevated position while in the downstream position to a fully lowered position, simultaneously during upward movement of the other head from a fully lowered position while the other head is in the upstream retracted position, said one head supporting product in stacked relation on the product support element thereof until said one head reaches the fully lowered position, said other head then moving to the downstream position while in the fully elevated position to move the stacked product on said one head to the stack accumulation area.

2. The downstacker apparatus as defined in claim 1 wherein said means for vertically shifting the lowerating-pushing heads comprises an endless member operatively connected to said heads and trained about a pair of revolvable elements.

3. The downstacker apparatus as defined in claim 1 wherein said means for shifting said lowerating-pushing heads between said upstream retracted position and said downstream position includes a revolvable rock shaft, means for revolving said rock shaft, and means defining linkages interconnecting said rock shaft and said lowerating-pushing heads.

4. A downstacker apparatus for continuously stacking dimensionally stable product comprising:

a support frame;

conveyor means on said frame for continuously delivering product in a downstream direction and discharging the product into a stacking chamber, a pair of substantially identical lowerating-pushing heads each having means thereon for supporting product to be stacked thereon, and each head having means thereon for engaging and pushing product from the other head, means mounting said lowerating-pushing heads on said frame for continuous oscillating movement of said heads through a continuous cyclic path of travel, drive means operatively connected with said lowerating-pushing heads for continuously shifting the heads through said continuous cyclic path of travel, one of said heads during said travel moving downwardly from a fully elevated position while in the downstream position to a fully lowered position, simultaneously during upward movement of the other head from a fully lowered position while the other head is in the upstream retracted position, said one head supporting product in stacked relation on the product supporting means thereof until said one head reaches the fully lowered position, said other head then moving to the downstream position while in the fully elevated position to push the stacked product on said one head by said pushing means from the stacking chamber to a stack accumulation area.

5. The apparatus as defined in claim 4 wherein said conveyor means includes an infeed conveyor and an accelerating conveyor, said infeed conveyor delivering product to be stacked to said accelerating conveyor whereby the latter accelerates delivery of the product to said stacking chamber.

6. The apparatus as defined in claim 4 wherein said support means on each lowerating-pushing head comprises a horizontal support element, said engaging and pushing means comprising a vertical pushing element.

7. The apparatus as defined in claim 6 wherein said horizontal support element of each lowerating-pushing head is positioned at the upper portion of each lowerating-pushing head.

8. The apparatus as defined in claim 6 wherein said vertical pushing element for each lowerating-pushing head extends downwardly and at substantially right angles to the associated horizontal support element.

9. The apparatus as defined in claim 4 wherein said drive means includes an endless driven member connected with said lowerating-pushing heads for vertically shifting said heads during said cyclic path of travel.

10. The apparatus as defined in claim 4 wherein said drive means includes a down revolvable rock shaft, and linkages interconnecting said rock shaft and lowerating-pushing heads for shifting the lowerating-pushing heads between said upstream and downstream positions.

* * * * *